United States Patent
Zierle et al.

(10) Patent No.: US 7,334,816 B2
(45) Date of Patent: Feb. 26, 2008

(54) KNEE PROTECTION DEVICE FOR OCCUPANTS OF A MOTOR VEHICLE

(75) Inventors: Matthias Zierle, Filderstadt (DE); Martin Frank, Muehlacker (DE); Guido Horsch, Althengstett (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 407 days.

(21) Appl. No.: 11/073,577

(22) Filed: Mar. 8, 2005

(65) Prior Publication Data

US 2005/0200110 A1 Sep. 15, 2005

(30) Foreign Application Priority Data

Mar. 9, 2004 (DE) .................. 10 2004 011 330

(51) Int. Cl. *B60R 21/045* (2006.01)
(52) U.S. Cl. .................................................. 280/752
(58) Field of Classification Search ................ 280/752, 280/751; 296/189, 190.1, 70; 188/371
See application file for complete search history.

(56) References Cited

U.S. PATENT DOCUMENTS

| 3,907,326 | A |   | 9/1975 | Arntson et al. |
| 3,938,821 | A |   | 2/1976 | Haas et al. |
| 3,966,227 | A | * | 6/1976 | Cameron ................. 280/752 |
| 4,786,540 | A |   | 11/1988 | Bruhnke et al. |
| 5,577,770 | A |   | 11/1996 | Sinner et al. |
| 6,086,098 | A |   | 7/2000 | Reiter et al. |
| 6,170,872 | B1 |   | 1/2001 | Bair et al. |
| 2002/0054977 | A1 |   | 5/2002 | Akasaka et al. |

FOREIGN PATENT DOCUMENTS

| DE | 41 05 027 C1 | 2/1991 |
| DE | 195 11 512 A1 | 3/1995 |
| DE | 296 16 485 U1 | 9/1996 |
| GB | 2 339 174 A | 1/2000 |

* cited by examiner

*Primary Examiner*—Faye M. Fleming
(74) *Attorney, Agent, or Firm*—Crowell & Moring LLP

(57) ABSTRACT

A knee protection device for a motor vehicle, is arranged in the area of a control panel and comprises a knee impact wall having a foam material pad, which knee impact wall extends adjacent to knees of vehicle occupants. The knee impact wall has an inner shell and an outer shell which bound a cavity accommodating the foam material pad and are assembled at connection zones as well as mutually connected by suitable measures.

7 Claims, 3 Drawing Sheets

KNEE PROTECTION DEVICE FOR OCCUPANTS OF A MOTOR VEHICLE

BACKGROUND AND SUMMARY OF THE INVENTION

This application claims the priority of German patent document 10 2004 011 330.0, filed Mar. 9, 2004, the disclosure of which is expressly incorporated by reference herein.

The present invention relates to a knee protection device for occupants of a motor vehicle.

U.S. Pat. No. 3,907,326 discloses a known knee protection device initially mentioned type, which has a knee impact wall that is held in position by a console below an energy-absorbing steering column device. The knee impact wall has a carrier wall made of metal which is adjoined by a pad made of foam material, which is covered by a plastic material. A comparable arrangement is also disclosed in U.S. Pat. No. 3,938,821.

German Patent Document DE 296 16 485 U1 relates to a safety device for a motor vehicle having a knee stop for occupants in the area of a dashboard in an occupant compartment of the motor vehicle. The knee stop has a knee impact wall with an extruded profile and a covering part for the latter which extends adjacent to the occupants' knees and consists of a hard plastic foam.

One object of the invention is to provide a knee protection device of the type described above, which is simple and effective, and which is easily manufactured.

This and other objects and advantages are achieved by the knee protection apparatus according to the invention, which includes a knee impact wall having an inner shell, an outer shell and a foam material pad, which can be produced in a simple manner and can be assembled to a unit. The object of the invention is also promoted by the profile of a U-shaped cross-section as well as the first connection bend and the second connection bend. Finally, if designed correspondingly (so that the deformation element bears the main deformation load and the knee impact wall bears a partial deformation load), the knee impact wall and the deformation element provide a highly effective and targeted protection for the occupants of the motor vehicle.

Other objects, advantages and novel features of the present invention will become apparent from the following detailed description of the invention when considered in conjunction with the accompanying drawings.

DETAILED DESCRIPTION OF THE DRAWINGS

Figure 1:
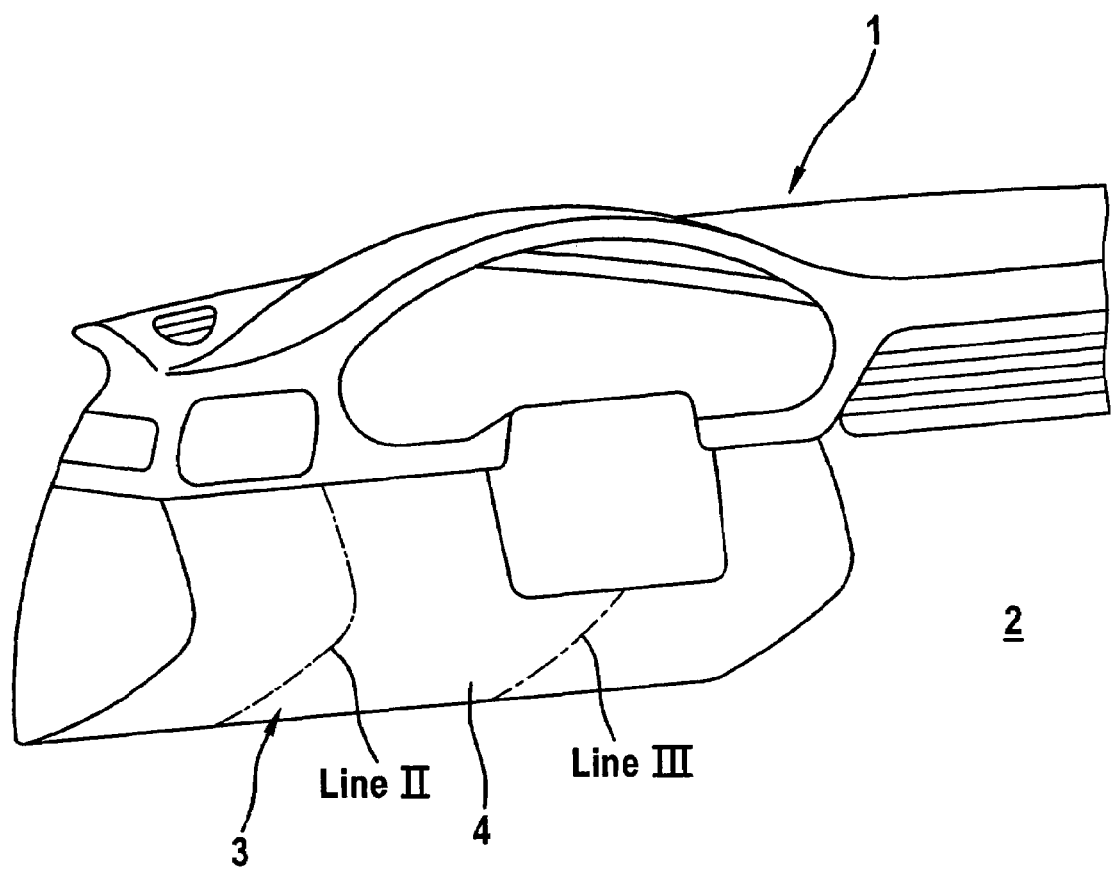
FIG. 1 is a perspective rear view from the outside of a control panel of a motor vehicle having the knee protection device according to the invention.
Figure 2:
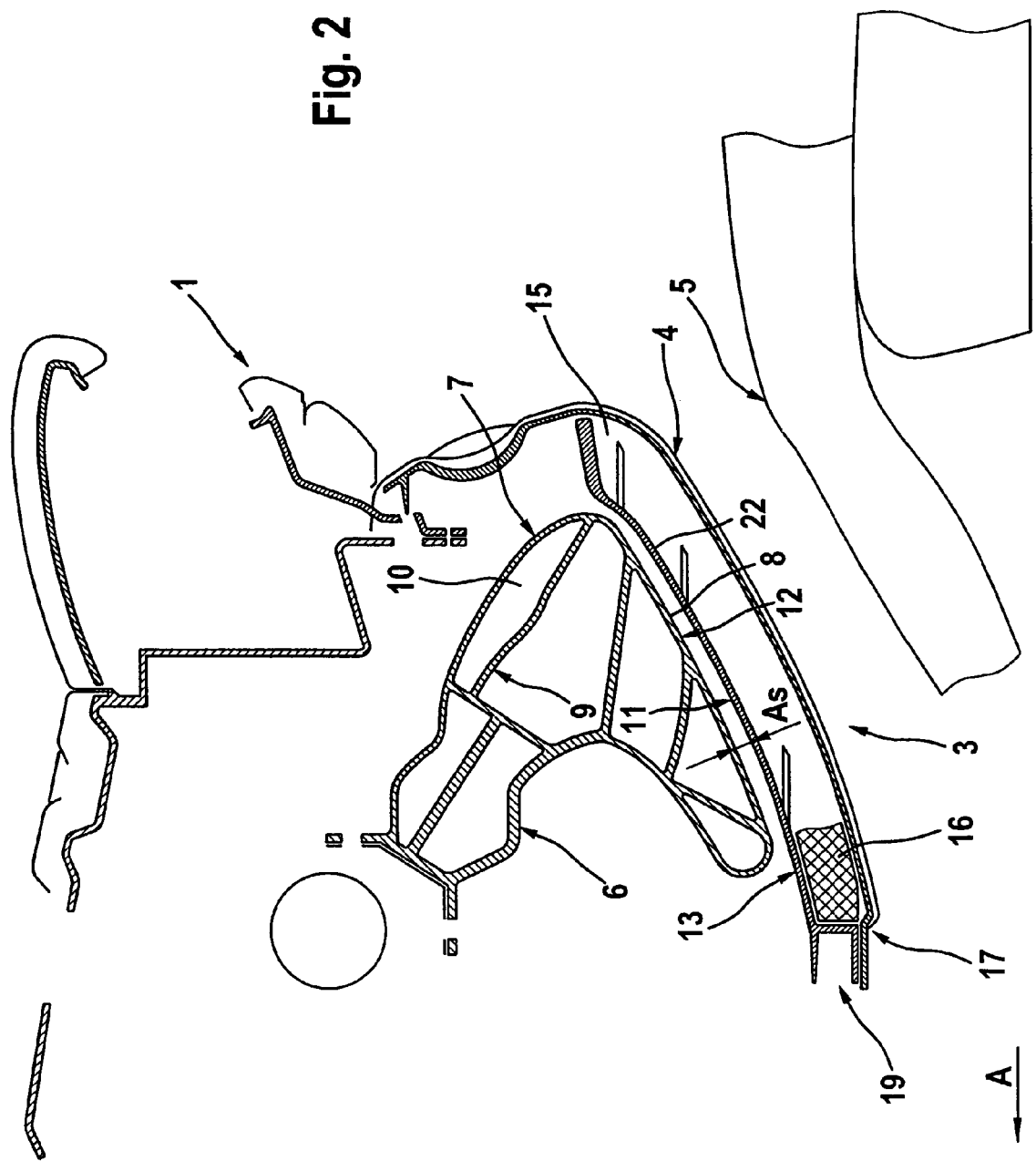
FIG. 2 is an enlarged sectional view along Line II of FIG. 1.

As shown in Figure, a control panel 1 is installed in an occupant compartment 2 of a motor vehicle (not shown in detail), and is equipped with a knee protection device 3 for occupants. The knee protection device comprises a knee impact wall 4 which is arranged adjacent to knees 5 of the occupants (FIG. 2), and covers a deformation element 6. The deformation element 6 is, for example, formed by an extruded profile 7 made of a light-metal alloy. As a result of a defined arrangement of walls 8, webs and cavities 10, the extruded profile 7 provides a targeted protection for occupants in the event of accident-caused damage to the motor vehicle, if the occupants are displaced toward the front in the driving direction A. In this case, the deformation element 6 performs the main deformation function, while the knee impact wall 4 performs a partial deformation function. The knee impact wall 4 has a first inner supporting surface 11 which faces the deformation element 6 and extends at, for example, a constant distance As from a second supporting surface 12 of the deformation element 6.

The knee impact wall 4 has a multipart construction, including an inner shell 13 and an outer shell 14 which bound a cavity 15, into which a foam material pad 16 is inserted. The inner shell 13 and the outer shell 14 are mutually connected at first and second connection zones 17 and 18 by suitable measures. The inner shell 13, the outer shell 14 and the foam material pad 16 are made of a plastic material, and the the inner shell 13 and the outer shell 14 are designed to have a defined dimensional stability. In combination with the foam material pad 16, the two shells perform a partial deformation function for the knee protection device 3.

At least the first connection zone 17 is provided with a U-shaped profile 19 that has legs 20 and 21. One leg 20 is aligned approximately with, and connected with, the plane of an inner shell wall 22 representing the supporting plane 11. An edge flange 23 of the outer shell 14 rests against the other leg 21. The leg 21 and the edge flange 23 are mutually connected by means of gluing or another suitable method.

Figure 3:
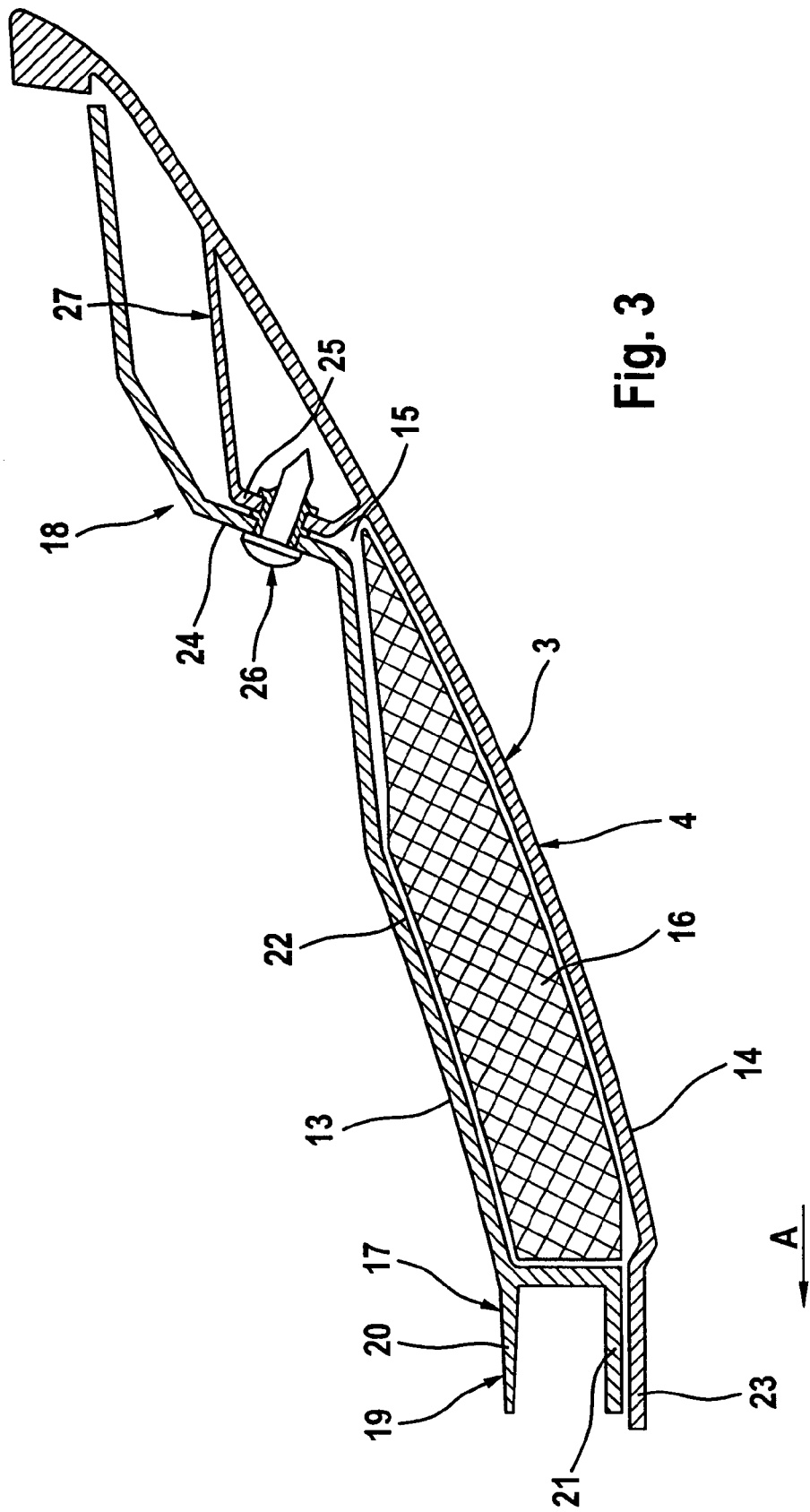
FIG. 3 is an enlarged sectional view along Line III of FIG. 1.

First and second connection bends 24 and 25 (FIG. 3) are provided between the inner shell 13 and the outer shell 14 in the area of the second connection zone 18, and are connected with one another by means of one or more screws 26. The first connection bend 24 is provided on the inner shell 22; the second connection bend 25 is provided on the outer shell 14. The second connection bend 25 is a component of a hollow body 27 which is integrated in the outer shell 14 and provides a defined stiffness to the outer shell 14 in the area of the second connection zone 18.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A knee protection device for a motor vehicle, said device being arranged at a vehicle control panel and comprising a knee impact wall with a foam material pad, which knee impact wall extends adjacent to knees of a vehicle occupant; wherein, the knee impact wall has an inner shell and an outer shell which bound a cavity receiving the foam material pad;

the inner and outer shells are assembled at connection zones and are connected with each other;

a first connection zone between the inner shell and the outer shell has a profile with a U-shaped cross-section;

a second connection zone is provided between the inner shell and the outer shell;

a first connection bend and a second connection bend are guided together at said second connection zone;

the first connection bed is provided on the inner shell;

the second connection bend is provided on the other shell; and the second connection bend is a component of a hollow body of the outer shell.

2. The knee protection device according to claim 1, wherein an edge flange of the outer shell rests on one leg of said U-shaped cross-section.

3. The knee protection device according to claim 2, wherein the leg and the edge flange are connected to each other by gluing.

4. The knee protection device according claim 2, wherein:
the profile is provided on the inner shell; and
the edge flange is provided on the outer shell.

5. The knee protection device according to claim 1, wherein the first connection bend and the second connection bend are connected to each other by screws.

6. The knee protection device according to claim 1, further comprising a deformation element, wherein:
the knee impact wall covers the deformation element, whereby the deformation element carries out the main deformation task and the knee impact wall carries out a partial deformation task.

7. The knee protection device according to claim 6, wherein a first inner supporting surface of the knee impact wall extends at a distance from a second supporting surface of the deformation element.

* * * * *